6 Sheets—Sheet 1.

T. MUNNELL.

CASH REGISTER.

No. 11,169 Reissued June 2, 1891.

Witnesses:
Dan'l Fisher
Howard S. Kroh

Inventor:
Thomas Munnell,
by Wm. H. T. Howard,
Atty.

THE ECKERT LITHOGRAPHING CO., WASHINGTON, D. C.

T. MUNNELL.

CASH REGISTER.

No. 11,169. Reissued June 2, 1891.

Witnesses:
Dan'l Fisher
Howard S. Kirby

Inventor:
Thomas Munnell,
by G. H. N. J. Howard,
Atty.

THE ECKERT LITHOGRAPHING CO., WASHINGTON, D. C.

T. MUNNELL.

CASH REGISTER.

No. 11,169. Reissued June 2, 1891.

Witnesses:

Dan'l Fisher

Howard S. Kirby

Inventor:

Thomas Munnell, by Wm. W. T. Howard,

Atty.

T. MUNNELL.

CASH REGISTER.

No. 11,169. Reissued June 2, 1891.

Witnesses:

Dan'l Fisher

Howard S. Kroh

Inventor:

Thomas Munnell by G. H. S. Howard

Atty.

T. MUNNELL.

CASH REGISTER.

No. 11,169. Reissued June 2, 1891.

*Witnesses:*

Dan'l Fisher

Howard S. Kroh

*Inventor:*

Thomas Munnell, by W. H. T. Howard,

Atty.

T. MUNNELL.

CASH REGISTER.

No. 11,169. Reissued June 2, 1891.

Witnesses:

Dan'l Fisher

Howard S. Kirk

Inventor:

Thomas Munnell by W. H. H. Howard atty.

UNITED STATES PATENT OFFICE.

THOMAS MUNNELL, OF BALTIMORE, MARYLAND.

CASH-REGISTER.

SPECIFICATION forming part of Reissued Letters Patent No. 11,169, dated June 2, 1891.

Original No. 354,433, dated December 14, 1886. Application for reissue filed February 24, 1891. Serial No. 382,613.

*To all whom it may concern:*

Be it known that I, THOMAS MUNNELL, late of Mount Sterling, in the county of Montgomery and State of Kentucky, but now residing at Baltimore, Maryland, have invented certain Improvements in Cash-Registers, of which the following is a specification.

In the description of the said invention which follows reference is made to the accompanying drawings, forming a part hereof, and in which—

Figure 1:
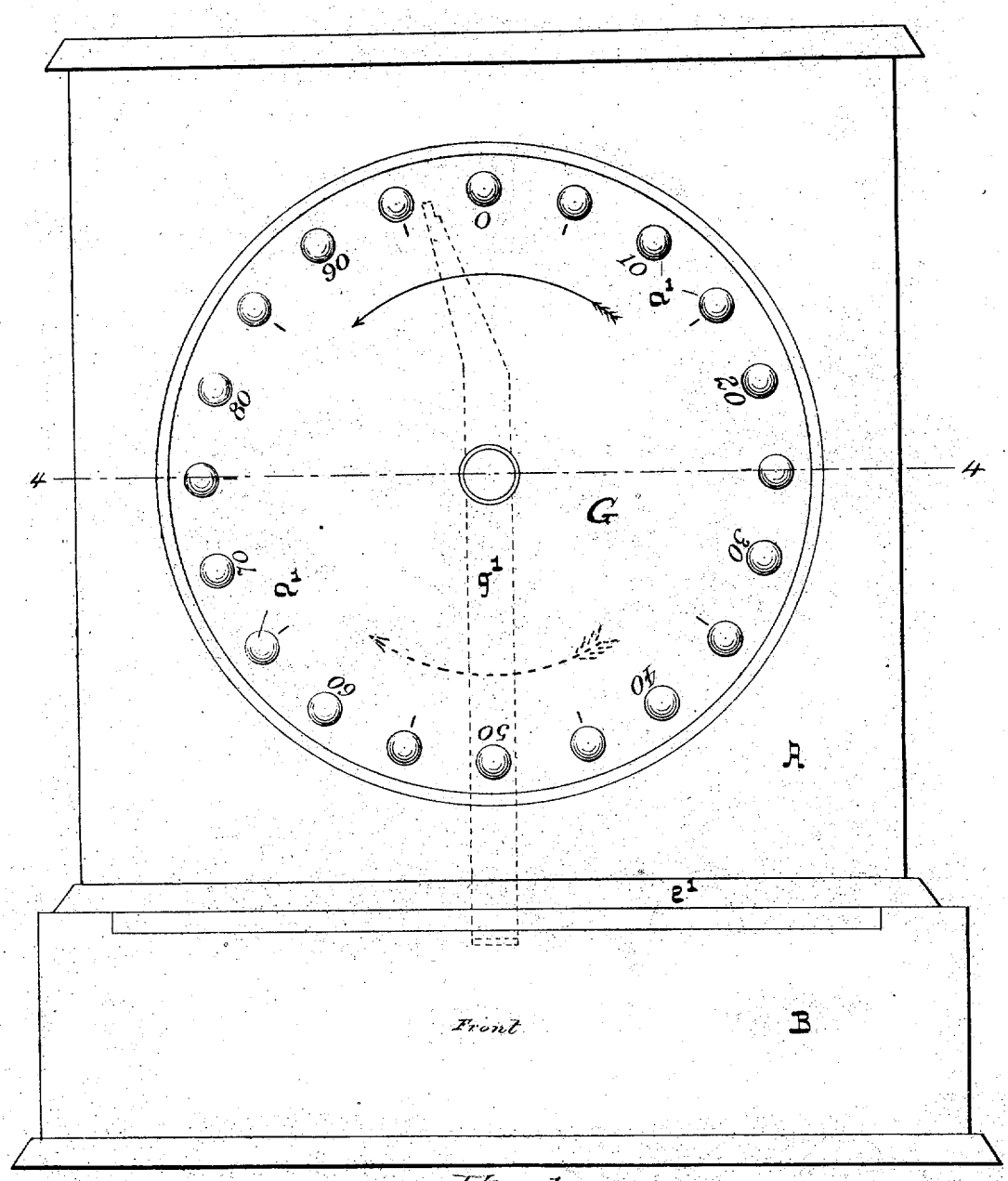
Figure 2:
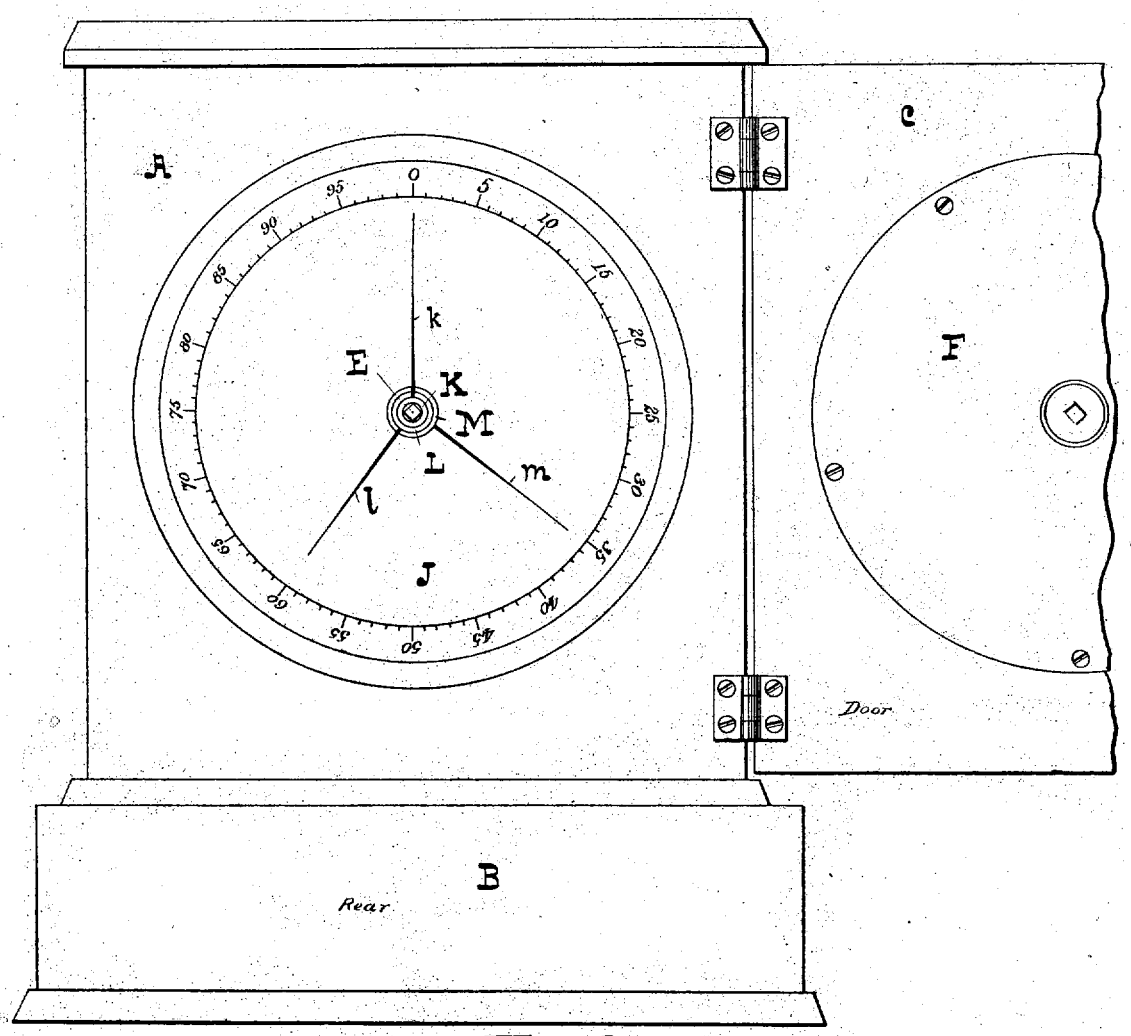
Figure 3:
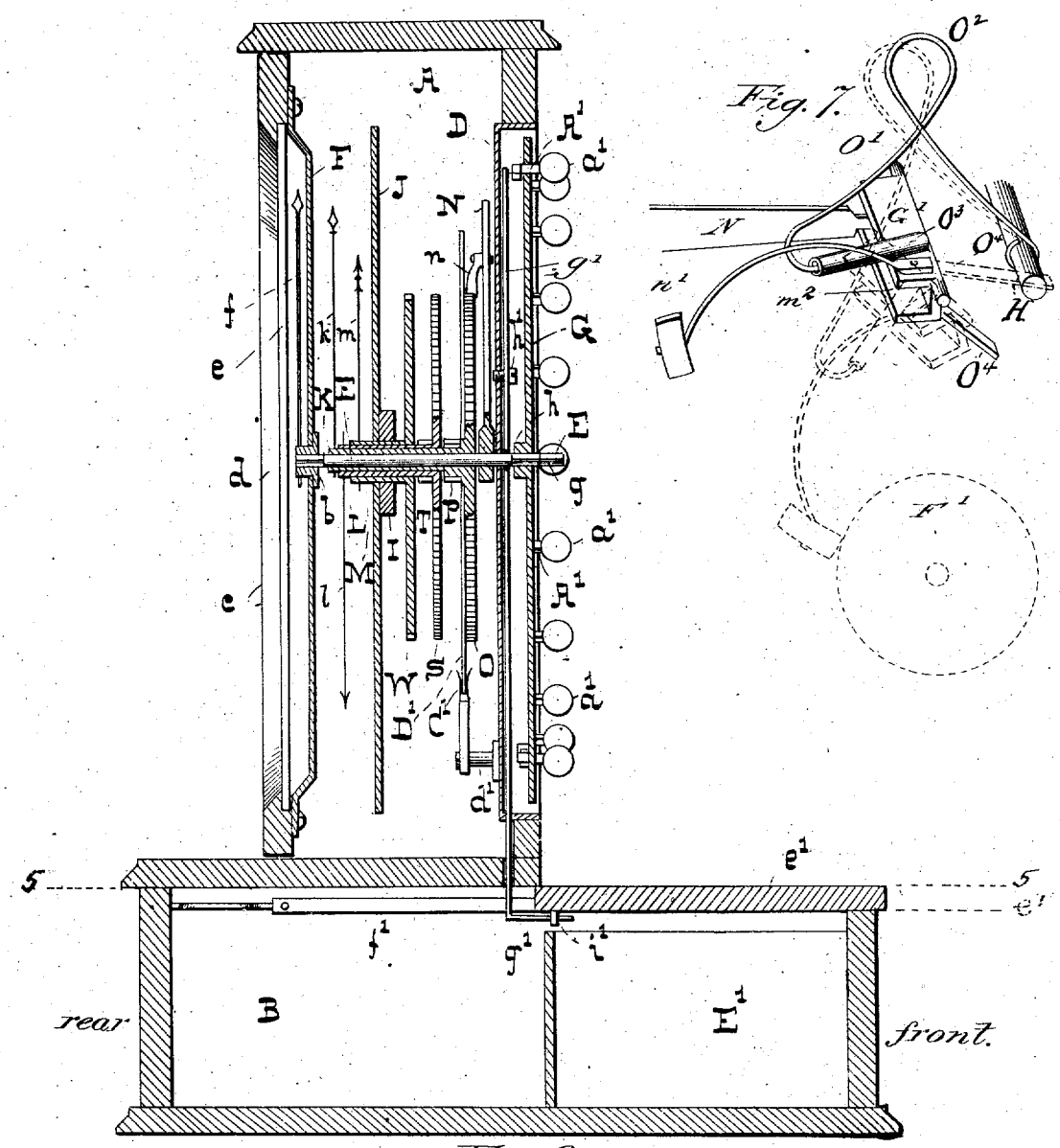
Figure 4:
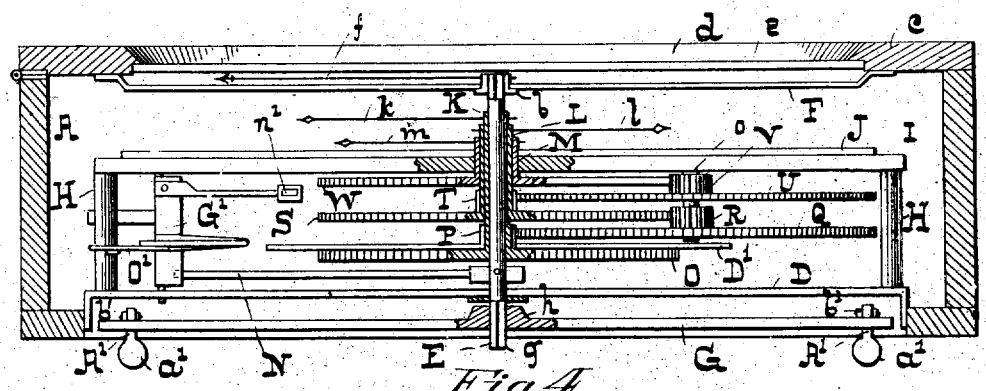
Figure 5:
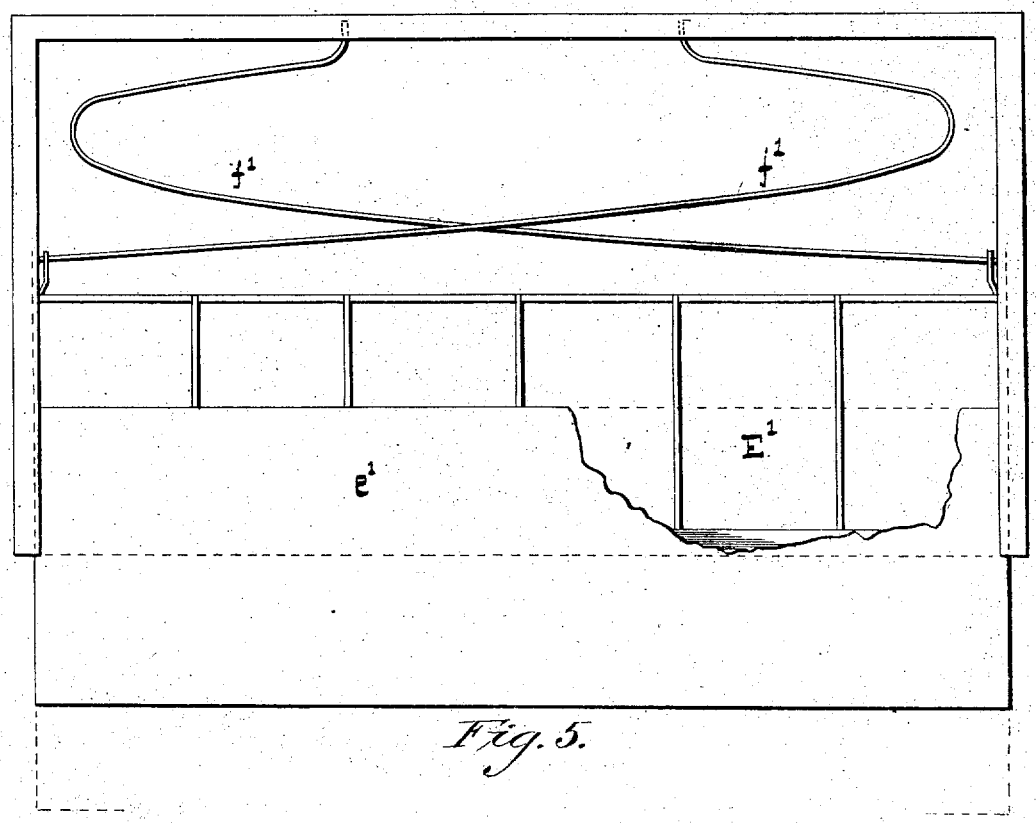
Figure 6:
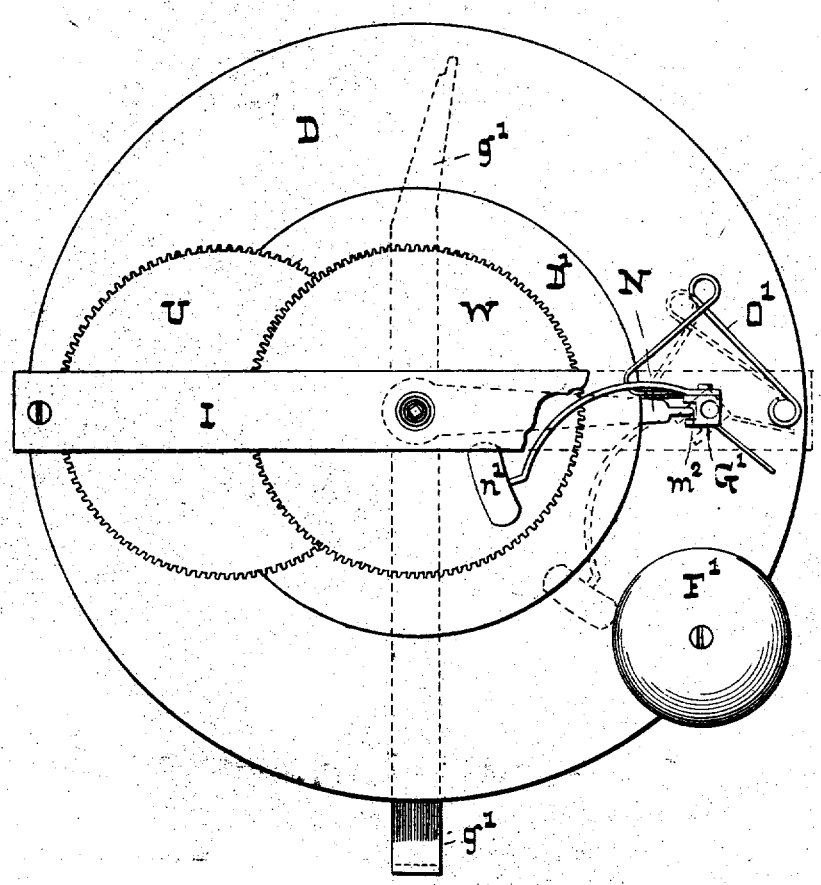
Figure 8:
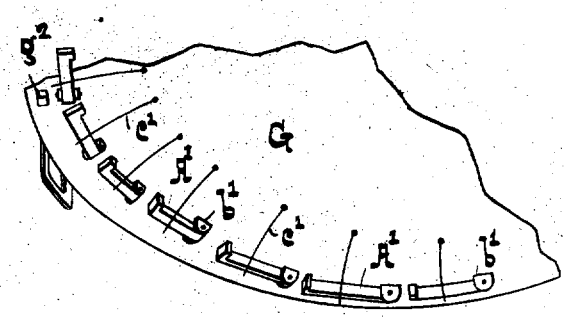
Figure 9:
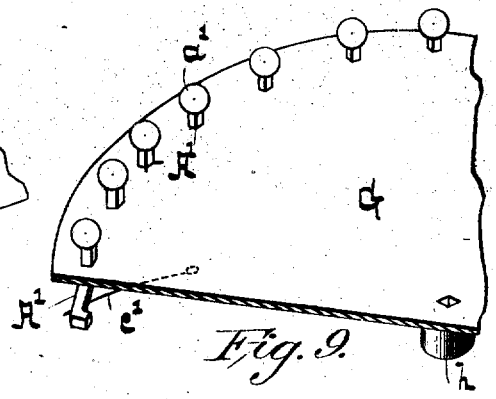
Figure 10:
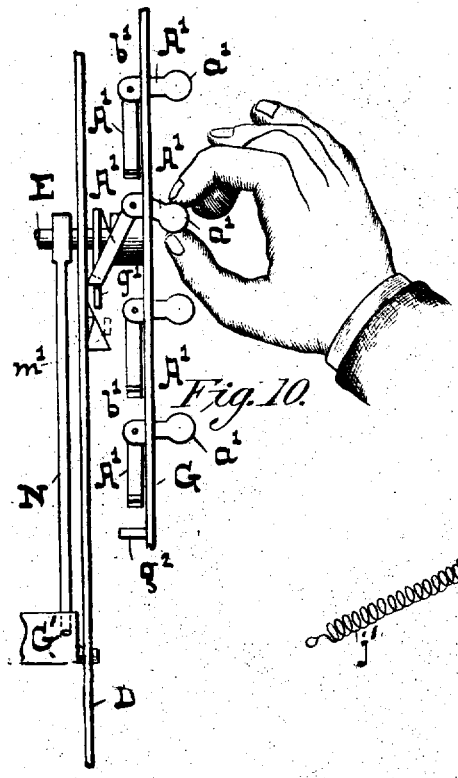
Figure 11:
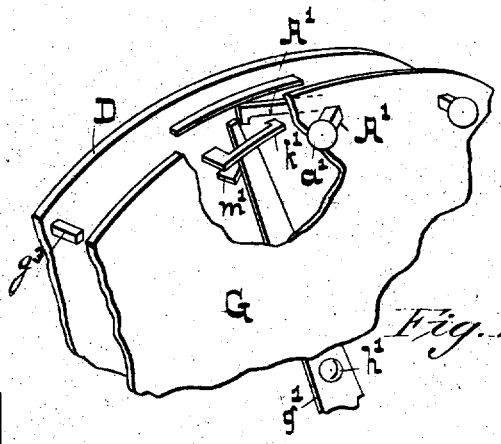
Figure 12:
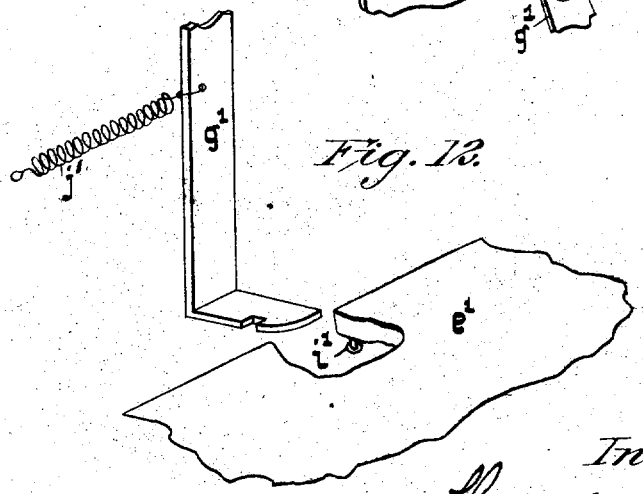

Figure 1 is an exterior front view of the improved cash-register, and Fig. 2 a back view with a hinged door at the rear open. Fig. 3 is a vertical central section as seen from the side of the machine, and Fig. 4 a horizontal section taken on the dotted line 4 4. Fig. 5 is a horizontal section taken on the dotted line 5 5, Fig. 3. Fig. 6 is a rear view of certain parts of the actuating mechanism of the cash-register, and Fig. 7 a perspective view of the mechanism which serves directly to strike the cash-drawer alarm-bell. Fig. 8 is a perspective view of a part of the operating-dial, as seen from its inner face; and Fig. 9, a similar view of the outer face of the same. Fig. 10 is an edge view of a portion of the dial and some of its immediate connections. Fig. 11 is a perspective front view of a portion of the said actuating dial and certain parts of the mechanism which serve to operate the cash-drawer. Fig. 12 is a perspective view of the lower end of a lever which constitutes a part of the drawer-operating devices and a portion of the lid of the drawer.

This invention relates to cash-registers; and it consists in the use of an operating-dial, a private registering-dial, and exposed customer's dial, indicating-hands for the registering and customer's dials, and suitable mechanism interposed between the operating-dial and the other two dials, whereby the hand on the customer's dial will indicate each rotary movement of the operating-dial in either direction, and the hands of the private dial will indicate the sum total of the amounts represented by the successive movements of the operating-dial in what may be termed the "registering direction" only.

It also consists in providing the operating-dial with a series of circumferentially-arranged levers, representing a series of numbers arranged in arithmetical progression, adapted to be projected from the face of said dial, and when the dial is rotated to come in contact with a stop on a fixed part of the register. The rotary movement of the dial will cause to be registered and indicated on the private dial and customer's dial, respectively, a number corresponding with the number of whatever lever may be projected.

It further consists in mechanism for sounding an alarm and opening the cash-drawer, which mechanism is operated by each movement of the operating-dial in a registering direction.

Referring to the drawings, A is the case of the cash-register, and B a hollow base for the case A, in which a stationary cash-drawer hereinafter described is situated.

D is a circular flanged plate, secured within an opening in the front wall of the case A. This plate is shown in section in Figs. 3 and 4.

E is a shaft, with its front end journaled in the plate D. The rear end of this shaft is square and adapted to fit into a sleeve *b*, which turns loosely in a dial-plate F, secured to a door *c*, which forms the back wall of the case A. This door has a circular opening *d*, furnished with a glass plate *e*, through which the dial F, which is termed the "customer's dial," is visible. The sleeve *b* is provided with a hand *f*, which, when the door *c* is closed, turns with the shaft E. The front end *g* of the shaft E is also square and passes through a similarly-shaped hole in a central boss *h* on the operating-dial G. It will thus be seen that the shaft E, sleeve *b*, and the hand *f* may be turned through the medium of the operating-dial G.

H H are posts projecting rearwardly from the plate D, which supports a bridge-piece I, to which a stationary or fixed dial-plate J, termed a "private dial," (see particularly Fig. 4,) is secured. This private dial is ordinarily hidden from view by the fixed customer's dial F in the door *c*, but is exposed to view when that door is open. The door *c* has a lock, so as to prevent the private dial being tampered with.

K is a loose sleeve on the shaft E, carrying a hand *k*. L is a second sleeve placed loosely on the sleeve K, provided with a hand *l*; and M is a third sleeve, fitted to turn loosely on the sleeve L, having a hand *m*. (See Fig. 3.)

The mechanism through which motion is communicated to the hands *k*, *l*, and *m* from the movable or operating dial G is arranged as follows: An arm N, rigidly secured to the shaft E, carries a pawl *n*, which rests on the edge of a spur-wheel O, fastened to the sleeve K. As the shaft E is rotated the arm N will also rotate, and when moving in one direction the pawl *n* will lock with one of the teeth on the spur-wheel O and cause the wheel to turn with the shaft E; but when the shaft E is turned in the opposite direction the pawl *n* will slip over the teeth on the wheel O, and the latter will therefore not be moved. The spur-wheel O has a pinion P, integral with it, which is in gear with a spur-wheel Q, of the same diameter as the one O, loosely mounted on a stud *o*, projecting from the bridge-piece I. This second spur Q carries a pinion R, corresponding in size with the one P, which pinion R is in gear with a spur-wheel S, attached to the sleeve L, and this spur-wheel S carries a pinion T, which is the same size as the ones P and R and is in gear with a fourth spur-wheel U, placed loosely on the stud *o* and provided with a pinion V, corresponding in size with those before described. The pinion V is in gear with the spur-wheel W, integral with the sleeve M. All the spur-wheels have one hundred teeth each and the pinions ten teeth. Consequently when the movable dial G and the hands *f* and *k* make a complete revolution the hand *l* makes the one-hundreth part of a revolution and the hand *m* the one-hundreth part of that.

From the foregoing it will be seen that while the operating-dial G, shaft E, and the hand *f* may be turned in either direction the hands *k*, *l*, and *m* move in one direction only.

The movable dial G has twenty holes near its periphery, which are numbered from 0 to 95, advancing by five, and through each hole projects a lever A′, having an exterior knob *a*′. The knobs *a*′ serve as finger-holds to rotate the dial G. These levers, which are bent at a right angle, are pivoted to lugs *b*′ on the inner face of the operating-dial, and the rear arm of each lever is held yieldingly to the said inner face by means of a spring-wire *c*′. (See particularly Fig. 8.)

The rear side of the operating-dial G has a lug $g^2$, which, as the said dial is turned by any one of the knobs *a*′ in the non-registering direction indicated by the arrow in dotted lines in Fig. 1, comes in contact with a stop $g^3$ on the plate D, and stops the said dial with the zero (0) mark at the top of the said plate, and the hand *f* at 0 or the zero-point of the customer's dial F, which has numerals corresponding with those on the operating-dial G. The backward movement of the operating-dial G, as described, has no effect on the other hands *k*, *l*, and *m*, in view of the pawl *n* clicking over the teeth of the spur-wheel O. This backward movement of the operating-dial G is always the preliminary step to registering a sale, and when it is completed the operation of registering a sale merely consists in turning the said operating-dial in a forward direction, as indicated by the arrow in full lines, by means of the knob indicating the amount to be registered, *until* the dial is stopped in the manner to be now explained.

In moving the operating-dial G in the forward or registering direction (indicated by the arrow in full lines, Fig. 1) by means of either of the knobs *a*′ the pressure on the knob will cause the attached lever to swing in its bearings *b*′ and project its inner arm outwardly against the pressure of the spring $c^2$, as shown in Fig. 10. The inner arm of each lever, when so projected, is adapted to engage the stop $g^3$, and thereby arrest the movement of the dial in the registering direction. From this it will be seen that the stop $g^3$ serves to arrest the rotation of the dial in either direction and serves as the starting and stopping point in each successive registration. The pressure exerted on either of the knobs in turning the dial in a non-registering direction will not move its attached lever from the normal position.

As the series of levers represent a series of numbers advancing in arithmetical progression by fives, it is clear that only numbers divisible by five can be registered by a single movement of the dial in the registering direction. When, therefore, it becomes necessary to register a number not divisible by five, the additional units must be registered by the lever opposite the zero-point on the dial, this lever being so arranged as to move the dial a sufficient distance in a registering direction to cause the spur-gear O to turn the space of one tooth before it (the lever) engages the stop $g^3$. Consequently each of such movements of the dial by the zero-lever would register one unit. To illustrate: Supposing the sale to be ninety-nine cents, the 95-knob must be employed. At the first operation ninety-five cents are registered, and then the zero-knob must be moved, as was the other, four times, which adds four more units to the already-indicated ninety-five, thus making the full number recorded by the hand *k* of the private dial ninety-nine.

It will be understood that with the train of multiplying-gearing described the hands *k*, *l*, and *m* of the private dial indicate, respectively, cents, dollars, and hundreds of dollars, and on it the sales for any period of time are recorded by them, provided all the said hands are placed at the zero-point at the beginning.

In order that the train of gearing described may be held so as to have no backward movement, a rubber or brake C′ is attached to a post *d*′, so as to engage with the periphery of a disk D′, which has a rotary movement in common with the spur-wheel O. (See Fig. 3.)

E′ is a stationary cash-drawer, having a sliding lid *e*′ with springs *f*′, which have the effect of forcing it out when it is not secured. (See Fig. 5.) The said lid $e'$ is held in a closed position by means of a hooked lever $g'$, pivoted at $h'$ to the plate D, the hooked end of which lever engages a lug $i'$ on the under side of the said lid. A helical spring $j'$ (shown particularly in Fig. 12) serves to keep the hooked lever yieldingly in engagement with the lug $i'$. The upper end of the lever $g'$ passes through a staple $k'$, projecting from the plate D, (see Fig. 11,) which limits its vibratory movement, and immediately below the staple $k'$ is an inclined projection $m'$.

When the operating-dial G is turned in a registering direction, the projected arm of the lever used to impel it will, just before it reaches the stop $g^3$, come in contact with the upper end of the lever $g'$ and cause said lever to swing on its pivot $h'$ and disengage its hooked end from the lug $i'$ on the lid of the cash-drawer. As soon as this disengagement takes place the springs $f'$ will project the lid $e'$ forward, as indicated in dotted lines, Fig. 3, thereby permitting access to the cash-drawer E'. As the upper end of the lever $g'$ is pushed forward it will ride up the inclined projection $m'$, which will force it sidewise until it becomes disengaged from the projected arm of the lever used to impel the dial. The helical spring $j'$ will then return the lever $g'$ to its normal position, ready to again lock the lid of the cash-drawer.

In order that an alarm may be sounded at the beginning of each registering movement of the operating-dial G, a bell F' is placed within the casing, together with suitable means to strike it. This striking mechanism is shown in Figs. 4, 6, and 7, and it consists of a bar G', having its ends journaled in the plate D and bridge-piece I. The bar G' has a longitudinal slot $m^2$, into which the end of the arm N is adapted to enter when the operating-dial G is turned to its limit in a non-registering direction, or to what may be termed the "zero-point." The bar G' carries a bell-hammer $n'$, adapted to strike the bell F' when the bar G' is forced by the spring O' into the position shown in dotted lines in Fig. 7. The spring O' is bent to form a loop $O^2$ and is attached at one end to one of the posts H, while its other end enters a tube $Q^3$, rigidly secured to the bar G'. This device operates as follows: When the operating-dial is returned to the zero-point, the arm N will enter the longitudinal slot $m^2$ and carry the bar G' and the bell-hammer $n'$ to the position shown in full lines, Fig. 7. When, however, the operating-dial begins its movement in a registering direction, the arm N will partially rotate the bar G' in its bearings and the spring O' will then operate to continue the rotation of said bar, causing the bell-hammer to descend quickly and strike the bell F', as indicated in dotted lines, Fig. 7. A short arm $O^4$, projecting rearwardly from the bar G', is adapted to come in contact with the post H to limit the rotation of the said bar, and also cause a slight rebound of the hammer $n'$ in order that the resonance of the bell may not be interfered with.

The cash-register is placed so that the rear will be in full view of the customer, in order that he may see by the customer's dial that the proper amount of his purchase has been registered.

I claim as my invention—

1. In a cash-register, a rotatable operating-dial having a lug thereon, combined with a fixed stop on the register, with which said lug is adapted to engage to limit the movement of the said dial in a non-registering direction and serve as the initial point from which the dial starts at each registering operation, a series of pivoted levers circumferentially arranged on said dial, each lever being adapted, when used to impel the dial in a registering direction, to engage said fixed stop and limit the movement of the operating-dial, a registering-dial, and suitable mechanism interposed between the two dials, whereby, the successive movements of the operating-dial in a registering direction are indicated by said registering-dial, substantially as specified.

2. In a cash-register, an operating-dial, a private registering-dial, a customer's dial, and a series of levers pivoted on said operating-dial, said levers representing a series of numbers arranged in arithmetical progression, combined with a fixed stop on the register, with which either of the levers, when used to impel the operating-dial in a registering direction, is adapted to engage, a lug on said operating-dial adapted to engage the said fixed stop to limit the movement of the operating-dial when turned in a non-registering direction, and suitable mechanism interposed between the operating-dial and the other two dials, whereby the movement of the operating-dial in either direction is indicated on the customer's dial and its movement in a registering direction only on the private dial, substantially as specified.

3. In a cash-register, a rotatable operating-dial, a series of levers each bent substantially at a right angle and pivoted to the inner face of said dial, one arm of each lever projecting through said dial to its outer face to serve as a finger-hold to rotate the dial and the other arm being held to the inner face of the dial by a spring, said series of levers representing a series of numbers arranged in arithmetical progression, combined with a stop on the register, with which the inner arm of either lever is adapted to engage when its outer arm is used as a finger-hold to rotate the dial in a registering direction, and suitable devices operated by said dial to register the sum of the numbers represented by the various levers employed to rotate the dial in its successive registering movements, substantially as specified.

4. In a cash-register, a rotatable operating-dial, a series of circumferentially-arranged levers pivoted on the inner face of said dial, each lever being bent at substantially a right angle and having one of its arms passing through to the outer face of said dial to serve as a finger-hold and the other arm yieldingly held against the inner face thereof, but adapted to be projected therefrom when its other arm is used to rotate the dial in a registering direction, combined with a cash-drawer, a lever pivoted on the register, the lower end of said lever serving as a lock for the cash-drawer and its upper end adapted to be engaged by the inner arm of either of the levers on the dial when projected, whereby the movement of said dial will serve to unlock the drawer, substantially as specified.

5. In a cash-register, a rotatable shaft, an operating-dial to rotate said shaft, a lug on the dial, and a fixed stop on the cash-register, combined with a bell, spring-actuated striking mechanism, substantially as described, and an arm carried by the rotatable shaft, adapted to hold the striking mechanism out of engagement with the bell when the said lug and stop are in engagement and to release it in order that an alarm may be sounded when the lug is moved away from the stop, as specified.

THOMAS MUNNELL.

Witnesses:
WM. T. HOWARD,
JNO. T. MADDOX.